US012444837B2

(12) United States Patent
Di et al.

(10) Patent No.: US 12,444,837 B2
(45) Date of Patent: Oct. 14, 2025

(54) HOUSING FOR CAVITY PHASE SHIFTER, CAVITY PHASE SHIFTER AND BASE STATION ANTENNA

(71) Applicant: Outdoor Wireless Networks LLC, Claremont, NC (US)

(72) Inventors: Keyun Di, Jiangsu (CN); Xun Zhang, Jiangsu (CN); Nengbin Liu, Jiangsu (CN); Puliang Tang, Jiangsu (CN); Ruixin Su, Jiangsu (CN)

(73) Assignee: Outdoor Wireless Networks LLC, Richardson, TX (US)

(*) Notice: Subject to any disclaimer, the term of this patent is extended or adjusted under 35 U.S.C. 154(b) by 90 days.

(21) Appl. No.: 18/690,165

(22) PCT Filed: Aug. 29, 2022

(86) PCT No.: PCT/US2022/075559
§ 371 (c)(1),
(2) Date: Mar. 7, 2024

(87) PCT Pub. No.: WO2023/044234
PCT Pub. Date: Mar. 23, 2023

(65) Prior Publication Data

US 2024/0387991 A1 Nov. 21, 2024

(30) Foreign Application Priority Data

Sep. 14, 2021 (CN) ......................... 202111072521.4

(51) Int. Cl.
*H01Q 3/34* (2006.01)
*H01P 1/18* (2006.01)
(Continued)

(52) U.S. Cl.
CPC ............... *H01Q 3/34* (2013.01); *H01P 1/184* (2013.01); *H01Q 1/246* (2013.01); *H01Q 21/26* (2013.01)

(58) Field of Classification Search
CPC .......... H01Q 1/246; H01Q 3/34; H01Q 21/26; H01P 1/184
See application file for complete search history.

(56) References Cited

U.S. PATENT DOCUMENTS

2020/0220252 A1 7/2020 Xiao et al.

FOREIGN PATENT DOCUMENTS

CN 111063996 A 4/2020
CN 210430036 U * 4/2020 ............... H01Q 3/36
(Continued)

OTHER PUBLICATIONS

"International Search Report and Written Opinion of the International Searching Authority", International Application No. PCT/US2022/075559, Dec. 23, 2022, 9 pp.

*Primary Examiner* — Hoang V Nguyen
(74) *Attorney, Agent, or Firm* — Myers Bigel, P.A.

(57) ABSTRACT

A housing for a cavity phase shifter comprises a first part that extends along the length of the cavity phase shifter and a separate second part that extends along the length of the cavity phase shifter. The first part comprises a substantially flat first base and first arms that extend from the two widthwise edges of the first base toward the second part and the second part comprises a substantially flat second base and second arms that extend from the two widthwise edges of the second base toward the first part. The first arms and the second arms at least partially overlap and are capacitively coupled to each other to form the first cavity of the cavity phase shifter.

20 Claims, 9 Drawing Sheets

(51) Int. Cl.
*H01Q 1/24* (2006.01)
*H01Q 21/26* (2006.01)

(56) References Cited

FOREIGN PATENT DOCUMENTS

| | | | |
|---|---|---|---|
| CN | 112003017 | A | 11/2020 |
| WO | 2020228688 | A1 | 11/2020 |
| WO | 2021096687 | A1 | 5/2021 |

* cited by examiner

HOUSING FOR CAVITY PHASE SHIFTER, CAVITY PHASE SHIFTER AND BASE STATION ANTENNA

CROSS-REFERENCE TO RELATED APPLICATIONS

The present application is a 35 U.S.C. § 371 national stage application of PCT Application No. PCT/US2022/075559, filed on Aug. 29, 2022, which itself claims priority to Chinese Patent Application No. 202111072521.4, filed Sep. 14, 2021, the entire contents of both of which are incorporated herein by reference as if set forth fully herein.

FIELD

The present disclosure relates to a housing for a cavity phase shifter, a cavity phase shifter and a base station antenna used in a communication system.

BACKGROUND

Wireless base stations are well known in the art, and generally include baseband units, radios, antennas and other components. Antennas are configured to provide bidirectional radio frequency ("RF") communication with fixed and mobile subscribers ("users") located throughout the cell. Generally, antennas are installed on towers or raised structures such as poles, roofs, water towers, etc., and separate baseband units and radio units are connected to the antennas.

FIG. 1 is a schematic structural diagram of a conventional base station 90. The base station 90 includes a base station antenna 95 that can be mounted on the antenna tower 94. The base station 90 also includes a baseband unit 91 and a radio 92. In order to simplify the drawing, a single baseband unit 91 and a single radio 92 are shown in FIG. 1. However, it should be understood that more than one baseband unit 91 and/or radio 92 may be provided. In addition, although the radio 92 is shown as being co-located with the baseband unit 91 at the bottom of the antenna tower 94, it should be understood that in other cases, the radio 92 may be a remote radio head (RRH) mounted on the antenna tower 94 adjacent to the base station antenna 95. The baseband unit 91 can receive data from another source, such as a backhaul network (not shown), and process the data and provide a data stream to the radio 92. The radio 92 may generate RF signals including data encoded therein and may amplify these RF signals and pass them to the base station antenna 95 through a radio frequency cable 93 (e.g. a coaxial transmission cable). It should also be understood that the base station 90 of FIG. 1 may generally include various other devices (not shown), such as a power supply, a backup battery, a power bus, an antenna interface signal group (AISG) controller, and the like. Generally, a base station antenna includes one or more phased arrays of radiating elements, wherein the radiating elements are arranged in one or more columns when the antenna is installed for use.

In order to transmit and receive RF signals to and from the defined coverage area, the antenna beam generated by an array of radiating elements that is included in the base station antenna 95 is usually inclined at a certain downward angle with respect to the horizontal plane (referred to as a "downtilt"). In some cases, the downtilt to the antenna beam is generated electronically by adjusting the relative phases of the sub-components of the RF signals that are fed to individual groups of radiating elements in the array that generates the antenna beam. The amount of electronic downtilt applied to the antenna beams generated by the arrays of radiating elements in the base station antenna 95 can, in some cases, be adjusted from a remote location. When a base station antenna has such a remote electronic tilt capability, the physical orientation of the base station antenna 95 may remain fixed, but the effective tilt angle of the generated antenna beams (i.e., the pointing angle of the peaks of the antenna beams with respect to the horizontal plane) can still be adjusted electronically, for example, by controlling phase shifters that adjust the relative phases of the sub-components of the RF signals that are provided to each radiating element in the arrays included in base station antenna 95. The phase shifters and other related circuits are usually built in the base station antenna 95 and can be controlled from a remote location. Typically, the Antenna Interface Standards Group (AISG) control signal is used to control the phase shifters.

Each phase shifter is usually constructed together with a power divider as a part of the feed network (or feeder component) of the base station antenna 95 that feeds RF signals received from the radio 92 to the arrays of radiating elements included in the base station antenna 95. The power divider divides an RF signal input to the feed network into a plurality of sub-components, and the phase shifter applies an adjustable respective phase shift to each sub-component so that each sub-component is fed to a respective sub-array that includes one or more radiating elements. Many different types of phase shifters are known in the art, including rotary wiper arm phase shifters, cavity phase shifters, trombone style phase shifters, sliding dielectric phase shifters, and sliding metal phase shifters. For a base station antenna with an antenna array that includes a large number of radiating element, using a cavity phase shifter can achieve a simpler circuit structure and mechanical structure as compared to using a rotary wiper arm phase shifter.

SUMMARY

According to a first aspect of the present disclosure, a housing for a cavity phase shifter is provided, comprising: a first part that extends along the length of the cavity phase shifter; and a second part that is separate from the first part, and which extends along the length of the cavity phase shifter, wherein the first part comprises a substantially flat first base and first arms that extend from the two widthwise edges of the first base toward the second part; the second part comprises a substantially flat second base and second arms that extend from the two widthwise edges of the second base toward the first part; and the first arms and the second arms at least partially overlap and are capacitively coupled to each other to form the first cavity of the cavity phase shifter.

According to a second aspect of the present disclosure, a cavity phase shifter is provided, comprising: a grounded housing that is configured to form a first cavity extending along the length of the cavity phase shifter; a strip conductor that is located in the first cavity and forms a stripline transmission line with the housing, wherein the housing comprises: a first part having a U-shaped cross-section; and a second part having a U-shaped cross-section, wherein the first part includes a first base and first arms extending from the two width-wise edges of the first base; the second part includes a second base and second arms extending from the two width-wise edges of the second base; and the second part is mounted to the first part in such a way that the first arms and the second arms at least partially overlap and are capacitively coupled to each other, so that a first cavity is formed between the first part and the second part.

According to a third aspect of the present disclosure, a base station antenna is provided, comprising: a backboard, which provides a ground plane; a cavity phase shifter positioned at the front side of the backboard, wherein the cavity phase shifter comprises a first cavity, a housing forming the first cavity, and a first strip conductor located in the first cavity that forms a stripline transmission line with the housing; a reflector positioned at the front side of the cavity phase shifter; and a first array of radiators positioned at the front side of the reflector, with the first strip conductor coupled to the first array, wherein the housing comprises a first part and a second part that can be separated from each other, of which the first part comprises a substantially flat first base and two first arms extending from the two widthwise edges of the first base toward the second part; the second part comprises a substantially flat second base and two second arms extending from the two widthwise edges of the second base toward the first part; and each of the first arms and the corresponding second arms at least partially overlap and are capacitively coupled with each other to form the first cavity, wherein the first of the first arms is capacitively coupled with the reflector and the second of the first arms is capacitively coupled with the backboard, such that the reflector, housing and backboard are commonly grounded.

Other features and advantages of the present disclosure will be made clear by the following detailed description of exemplary embodiments of the present disclosure with reference to the attached drawings.

BRIEF DESCRIPTION OF THE DRAWING

FIG. 3A is a bottom view of the base station antenna assembly, FIG. 3B is a front perspective view of the base station antenna assembly of FIG. 3A, FIG. 3C is a rear perspective view of the base station antenna assembly, FIG. 3D is a bottom view of a cavity phase shifter that is included in the base station antenna assembly, FIG. 3E is an enlarged perspective view showing the connections between a phase shifter and a feed board of the base station antenna assembly, and FIG. 3F is a perspective view showing the connections to a calibration board of the base station antenna assembly.

Figure 1:
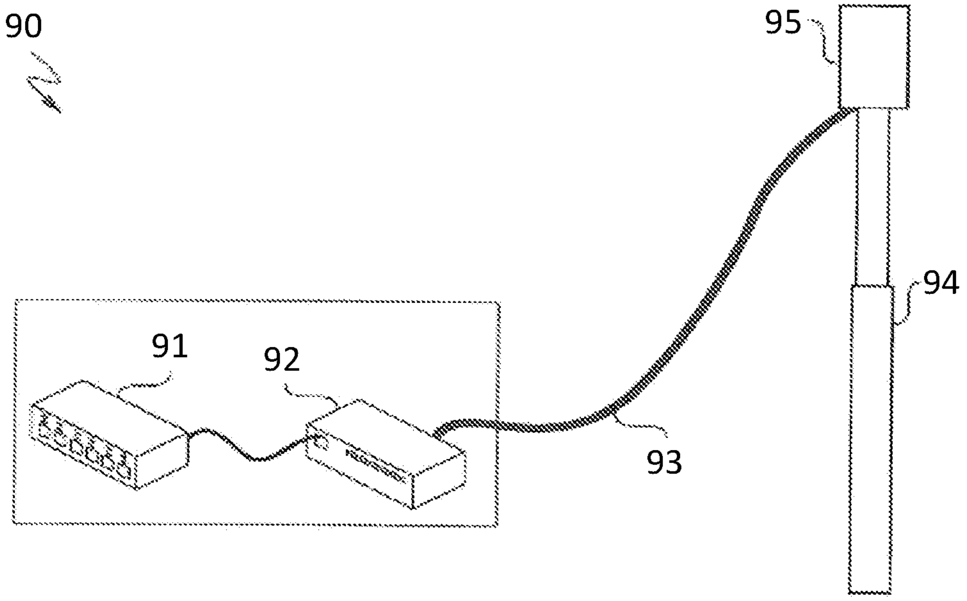
FIG. 1 is a schematic structural diagram of a conventional base station.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this specification, elements, nodes or features that are "coupled" together may be mentioned. Unless explicitly stated otherwise, "coupled" means that one element/node/feature can be mechanically, electrically, logically or otherwise connected with another element/node/feature in a direct or indirect manner to allow interaction, even though the two features may not be directly connected. That is, "coupled" is intended to comprise direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

It should be noted that, when a plurality of identical or similar elements are provided herein, two-part reference signs (e.g., cavity 44-1) may be used to label them in the drawing. These elements can be individually referred to by their full reference signs (e.g., cavity 44-1, cavity 44-2) herein, and may be collectively referred to by the first part of their reference signs (e.g., the cavities 44) when it is not necessary to distinguish them from each other.

Figure 2:
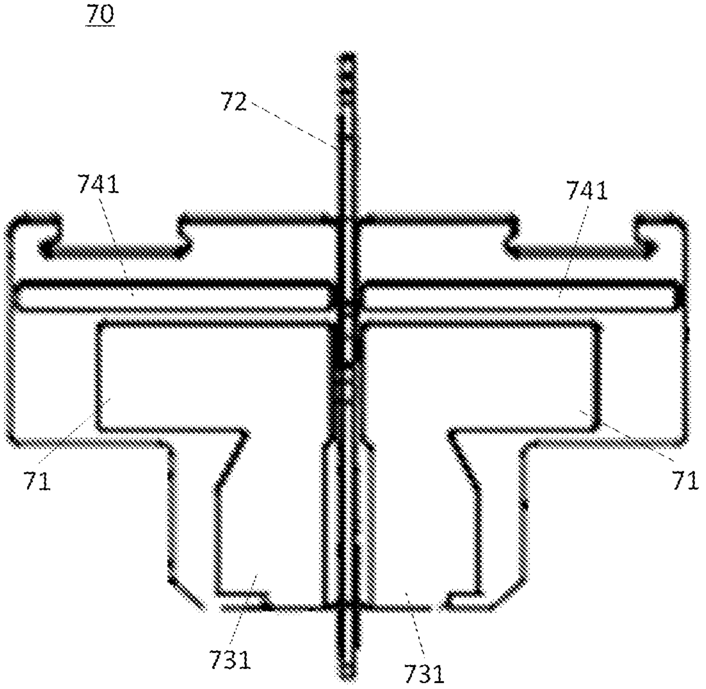
FIG. 2 is a schematic perspective view of a crossed-dipole radiating element that can be used in a base station antenna according to an embodiment of the present disclosure.

FIG. 2 is a schematic perspective view of a crossed-dipole radiating element 70 that can be used in a base station antenna according to an embodiment of the present disclosure. A plurality of the radiating elements 70 may be mounted to extend forwardly from a reflector of the base station antenna to form an array of radiating elements. The array will typically include one or more columns of radiating elements, and each column may be straight or staggered (i.e., all of the radiating elements in a column need not be exactly aligned along a common axis). Each radiating element 70 is typically implemented as a dual-polarized radiating element that includes a pair of dipole radiators 71 and 72. One of the dipole radiators (e.g., dipole radiator 71) is positioned at an angle of +45° with respect to the longitudinal (e.g., lengthwise) axis of the base station antenna, and the other dipole radiator (e.g., dipole radiator 72) is positioned at an angle of −45° with respect to the longitudinal axis of the base station antenna, such that the dipole radiators 71 and 72 are arranged orthogonally to each other. When dual-polarized radiating elements are used, the first dipole radiators 71 effectively form a first array of dipole radiators and the second dipole radiators 72 effectively form a second array of dipole radiators, where the two arrays of dipole radiators generate decorrelated antenna beams. Thus, the use of dual-polarized radiating elements allows doubling the number of antenna beams that the base station antenna 95 can generate at a time.

The radiating element 70 illustrated in FIG. 2 is a broadband radiating element that can transmit and receive signals in a first frequency band and a second frequency band, wherein the first frequency band is different from the second frequency band. The dipole radiators 71 and 72 may be configured to transmit and receive signals in the first frequency band. The radiating element 70 may further comprise a second pair of dipole radiators 741 and 742 that are parasitic with the radiators 71 and 72, respectively (refer to FIG. 2 and FIG. 3A). The parasitic dipole radiators 741 and 742 may be configured to transmit and receive signals in the second frequency band. The radiators 71 and 72 can be directly excited by the energy fed by their respective feed lines 731 and 732 (refer to FIG. 2 and FIG. 3A), and the parasitic radiators 741 and 742 may be excited by the energy electromagnetically coupled thereto from the corresponding dipole radiators 71 and 72. When referring to a "radiator" herein, unless otherwise specified, it can refer to either a radiator that is directly excited by the energy fed by the feed line (e.g. radiators 71 and 72), or to a parasitic radiator (e.g. radiators 741 and 742).

In this specific example, the radiating element 70 may be formed using a pair of printed circuit boards. The aforementioned radiators 71 and 72, the respective corresponding parasitic radiators 741 and 742, and the respective feed lines 731 and 732 are all conductive elements formed on the printed circuit boards. One printed circuit board of the pair of printed circuit boards may include a center slit that opens forward (the "forward" direction herein refers to the direction that is substantially perpendicular to the plane of the reflector and pointing to the main radiation direction of the radiating element), and the other printed circuit board may include a center slit that opens backward, which allows the two printed circuit boards to be fitted together to form an "X" shape (when viewed from the front). In both FIG. 5A and FIG. 5B, an X shape is used to represent the crossed-dipole radiating element.

It should be understood that the radiating element described with reference to FIG. 2 is only exemplary, and that a wide variety of radiating elements may be used in the base station antennas according to embodiments of the present disclosure.

The base station antennas according to embodiments of the present invention may include cavity phase shifters. The housing of each such cavity phase shifter may have multiple parts that are independent and separable from each other. The multiple parts are assembled to form the cavity of each cavity phase shifter, and a phase shifting component of the cavity phase shifter is mounted in each cavity. Forming the housing of the cavity phase shifter from multiple separable parts facilitates installing the phase shifting component within the cavity, and the multiple parts can be easily assembled together. In addition, when the housing includes a plurality of separable parts, each part is easy to manufacture. For example, when the housing is formed of metalized plastic, it is easier to form a metal coating on the surface of multiple separate parts than it is to form a metal coating on a one-piece housing. Moreover, when the housing is formed of multiple parts, at least some of the part may be conveniently formed of sheet metal, which can readily be formed through cost-effective stamping and bending processes.

Figure 5A:
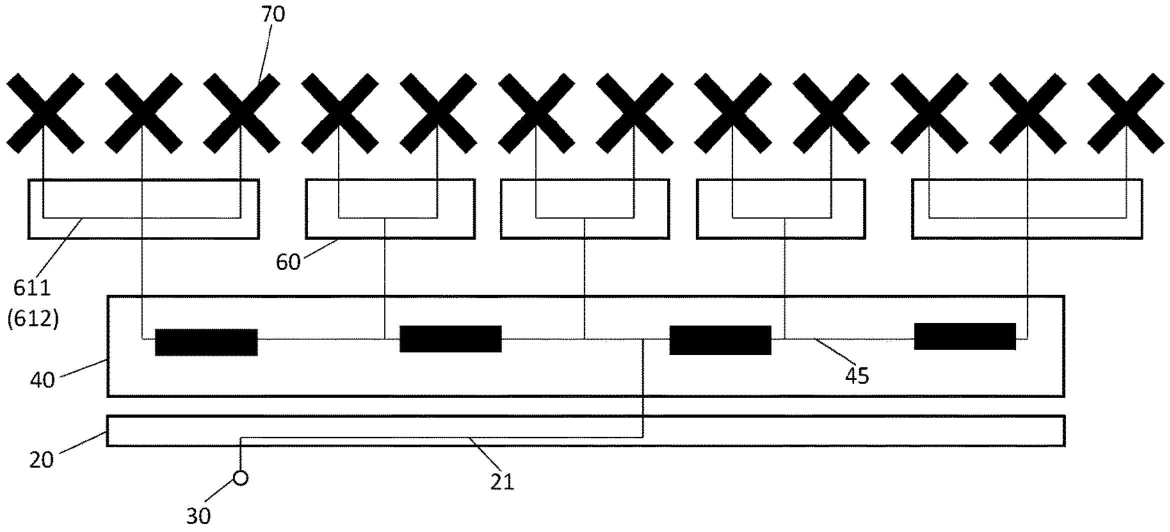
FIG. 5A and FIG. 5B are schematic functional block diagrams of at least part of a base station antenna according to an embodiment of the present disclosure.
Figure 5B:
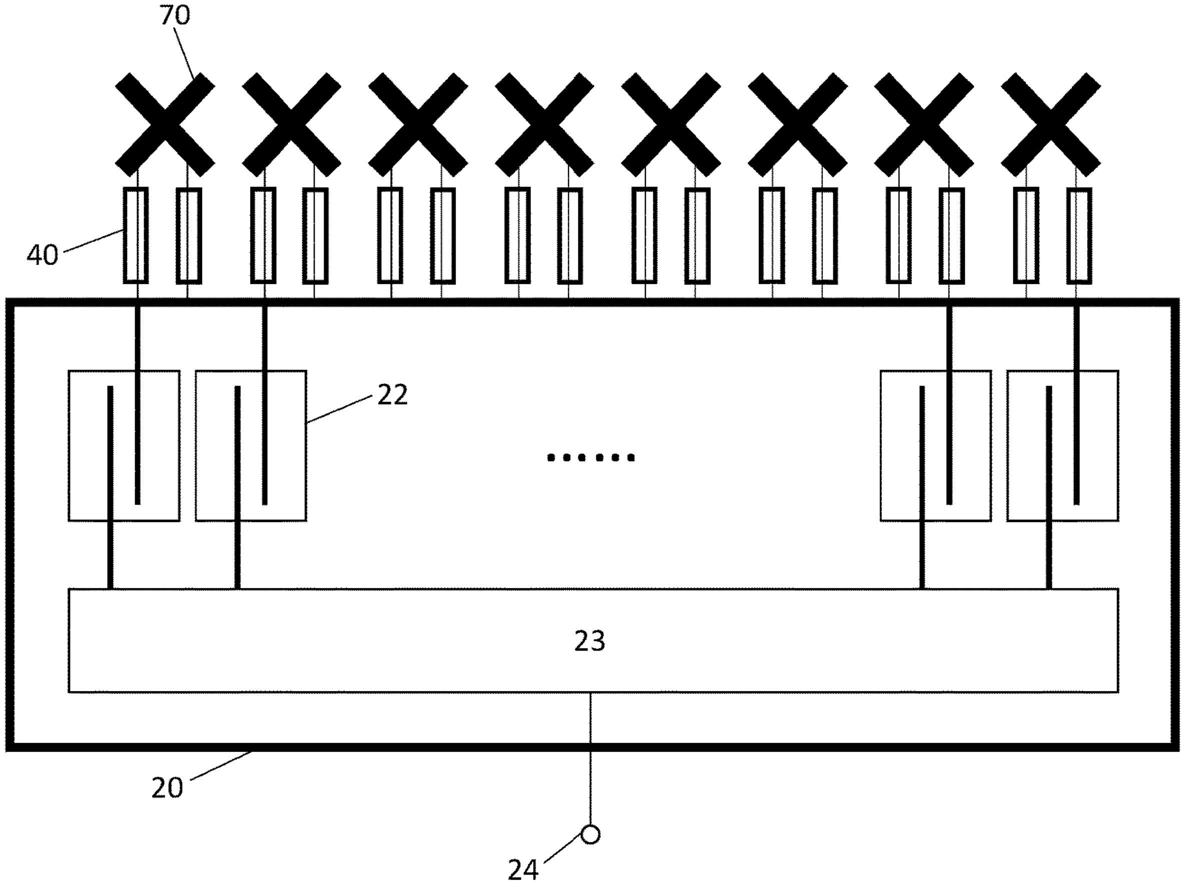

FIG. 3A to FIG. 3F are schematic diagrams of a base station antenna assembly that can be used in a base station antenna according to an embodiment of the present disclosure. FIG. 5A and FIG. 5B are schematic functional block diagrams of part of a base station antenna according to an embodiment of the present disclosure. The structure and function of the base station antenna according to embodiments of the present disclosure will be described below with reference to FIG. 3A to FIG. 3F, and FIGS. 5A and 5B.

Figure 3A:
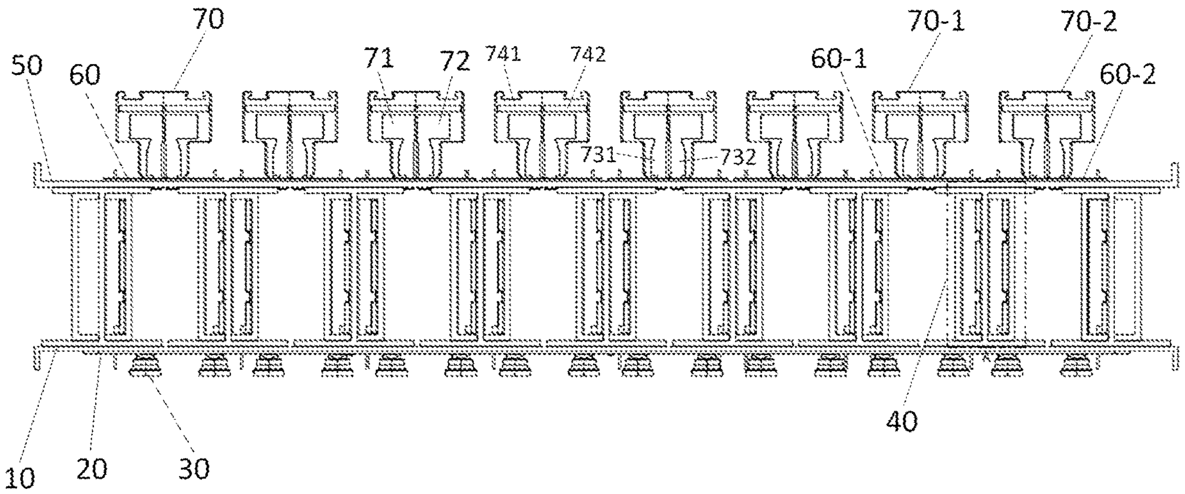
FIGS. 3A-3F are schematic diagrams of a base station antenna assembly that can be used in a base station antenna according to an embodiment of the present disclosure, where
Figure 3B:
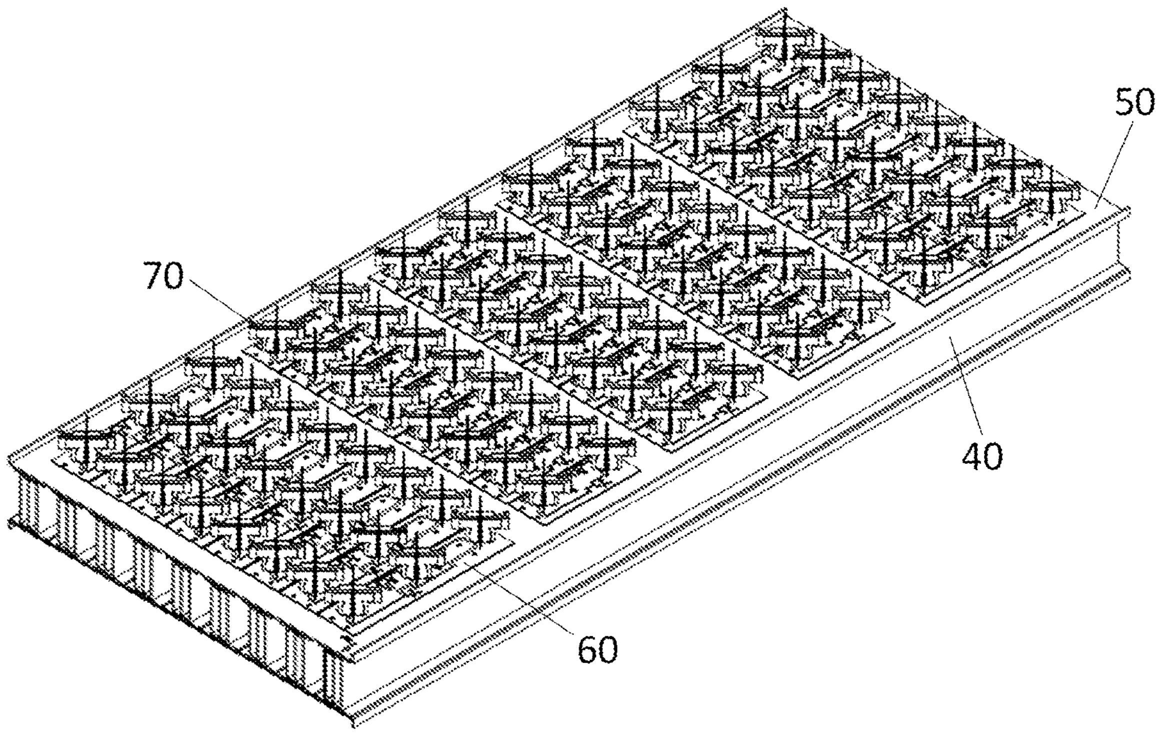

Referring to FIG. 3A, the base station antenna may include a backboard 10, a calibration board 20 that is positioned on a rear side of the backboard 10, a plurality of connectors 30 that extend rearwardly from the calibration board 20, a plurality of cavity phase shifters 40 that are positioned on a front side of the backboard 10, a reflector 50 mounted forwardly of the cavity phase shifters 40, a plurality of feed boards 60 on the front side of the reflector 50, and a plurality of radiating elements 70 that are mounted on the front side of the feed boards 60 to form a multi-column array of radiating elements 70. The backboard 10 is grounded to the outer conductors of the radio frequency cables that feed RF signals to the base station antenna assembly via the connectors 30, thereby providing a ground plane for the base station antenna assembly. The calibration board 20 is a calibration device for normalizing the amplitude and phase of the RF signals input to the base station antenna through the connectors 30. These RF signals may be passed to the base station assembly from respective ports of a radio (not shown). The connectors 30 are used to provide respective RF cable interfaces so that RF signals may be passed between another device or component (e.g. an RRU) and the base station antenna assembly. Each cavity phase shifter 40 adjusts the phases of sub-components of an RF signal that is input to the cavity phase shifter 40, and passes each sub-component to a respective sub-array of the radiating elements 70, where each sub-array includes one or more radiating elements 70. The reflector 50 redirects portions of the electromagnetic radiation that are emitted rearwardly by the radiating elements 70 to propagate in the forward direction. The reflector 50 may be capacitively coupled to the backboard 10 via the housings of the cavity phase shifters 40, such that the reflector 50, the housings of the cavity phase shifters 40, and the backboard 10 are commonly grounded. The rear surface of each feed board 60 includes a ground plane that is capacitively coupled to the reflector 50, and the front surface of each feed board 60 may include feed lines that are used to pass RF signals to the radiators of the radiating elements 70 mounted on the feed board 60. The radiating element 70 is a dual-polarized radiating element. For example, it may be a crossed-dipole radiating element as described above with reference to FIG. 2.

Figure 3C:
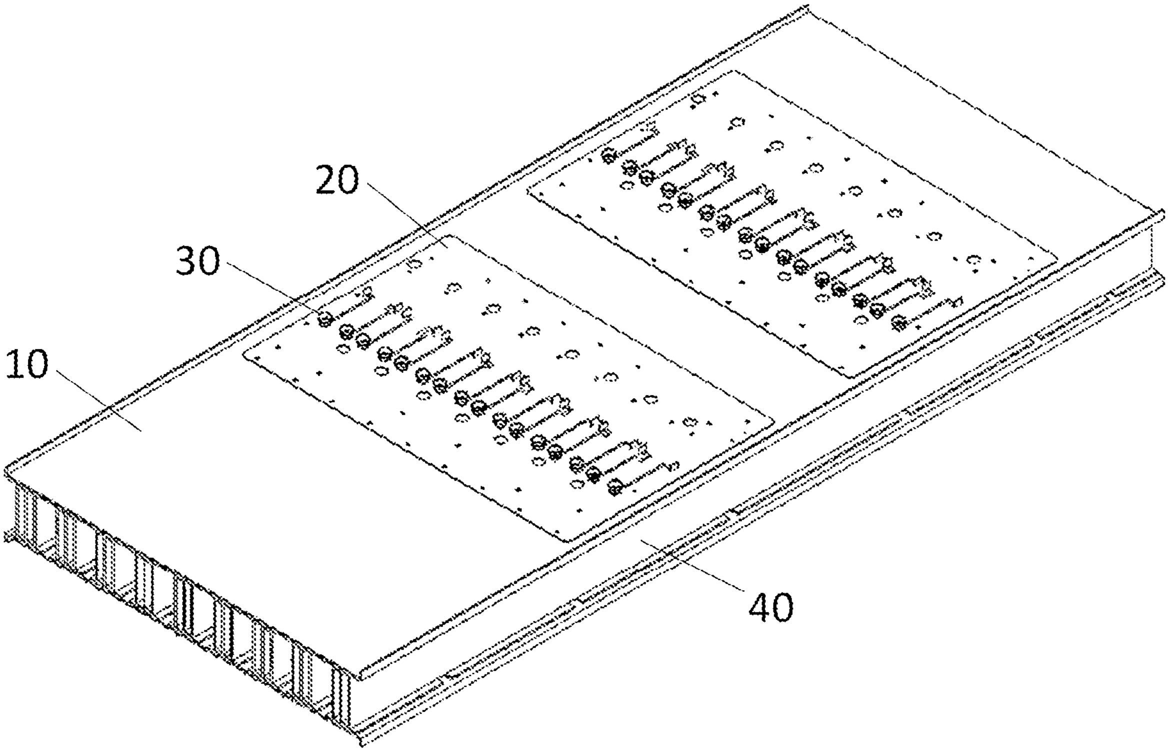
Figure 3D:
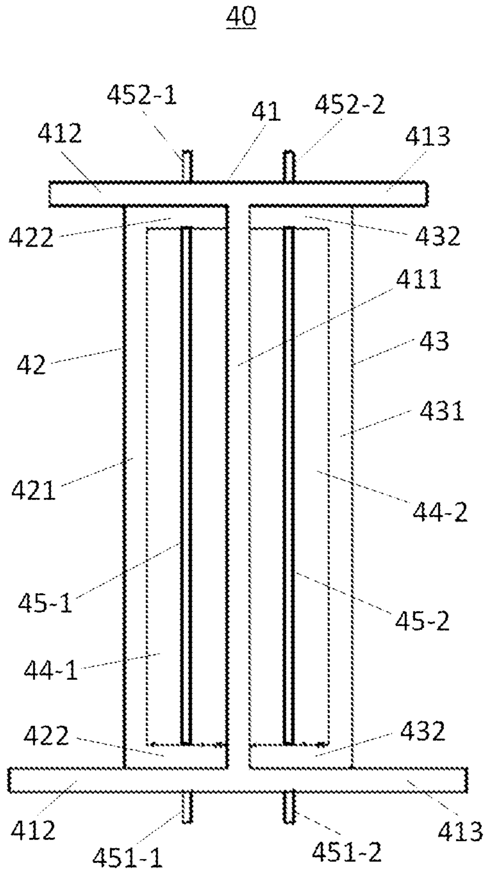

FIG. 3D is a cross-sectional view of a cavity phase shifter 40 that includes a pair of phase shifter components that may, for example, be used to adjust the phases of the sub-components of RF signals that are fed to one of the columns of radiating elements 70 included in the base station antenna assembly of FIG. 3A. Since dual-polarized radiating elements 70 are used, two phase shifter components may be provided for each column of radiating elements 70, with the first phase shifter component being used to adjust the relative phases of the sub-components of RF signals that are fed to the −45 degree dipole radiators of the radiating elements 70 in the column, and the second phase shifter component being used to adjust the relative phases of the sub-components of RF signals that are fed to the +45 degree dipole radiators of the radiating elements 70 in the column. Each cavity phase shifter 40 extends along the length of the base station antenna (see FIGS. 3A-3B), and its housing comprises a part 41 with an "I"-shaped cross-section, and parts 42 and 43 that each have a "U"-shaped cross-section. The parts 41, 42 and 43 are independent of each other and can be separated from each other. The part 41 and the part 42 are fitted together to form a first cavity 44-1, and the part 41 and part 43 are fitted together to form a second cavity 44-2. The cavities 44-1 and 44-2 are used to accommodate respective strip conductors 45-1 and 45-2. The strip conductors 45-1 and 45-2 form respective stripline transmission lines with the housing of the cavity phase shifter 40.

Part 41 includes a substantially flat base 411 and two arms 412 extending from the two widthwise edges of the base 411 toward the part 42. Part 42 includes a substantially flat base 421 and two arms 422 extending from the two widthwise edges of the base 421 toward the part 41. Each arm 412 of part 41 at least partially overlaps with a corresponding arm 422 of part 42, and these overlapping arms are capacitively coupled to each other to form a cavity 44-1. One of the two arms 412 (the upper arm 412 in the view direction of FIG. 3D) is also capacitively coupled with the reflector 50, and the other of the two arms 412 (the lower arm 412 in the view direction of FIG. 3D) is capacitively coupled with the backboard 10, such that the reflector 50, the parts 41 and 42, and the backboard 10 are commonly grounded. The strip conductor 45-1 accommodated in the cavity 44-1 forms a stripline transmission line with the grounded base 411 and the grounded base 421.

Part 43 includes a substantially flat base 431 and two arms 432 extending from the two widthwise edges of the base 431 toward the part 41. Part 41 further comprises two arms 413 extending away from the part 42 from the two widthwise edges of the base 411. Each arm 413 at least partially overlaps with a corresponding arm 432 and they are capacitively coupled to each other to form a cavity 44-2. Since the arms 432 of the part 43 are capacitively coupled with the arms 413 of the part 41, the part 43 is also commonly grounded with the reflector 50, the parts 41 and 42, and the backboard 10. The strip conductor 45-2 forms a stripline transmission line with the grounded base 411 and the grounded base 431.

It should be understood that the parts 41, 42 and 43 included in the housing of the cavity phase shifter 40 all include metal, such that the strip conductor 45 contained therein forms a cavity 44 that is substantially isolated from the outside world. In some embodiments, the parts 41, 42, and 43 may be formed of sheet metal and/or metalized plastic. Forming parts 41, 42 and 43 of metalized plastic can significantly reduce the weight of the housing of the cavity phase shifter 40, thereby reducing the weight of the base station antenna. In the case where parts of the housing are made of metalized plastic, each surface of the plastic forming each part may have a metal coating. For example, in the view direction of FIG. 3D, the part 41 may have a metal coating on the upper and lower surfaces of its arms 412 and 413 and the left and right side surfaces of the base 411, and the part 42 may have a metal coating on the upper and lower surfaces of its arms 422 and the left and right side surfaces of the base 421. Between the two layers of metal coating that form each capacitive coupling, a dielectric film (e.g. a spacer or a layer of paint) can be provided to ensure the passive intermodulation (PIM) performance of the base station antenna. Due to the simple shape of the parts 41, 42 and 43 of the housing of the cavity phase shifter 40, the parts 41, 42 and 43 can be easily manufactured whether they are formed of metal sheet or metalized plastic.

In addition, in order to improve the reliability of the grounding connection, it may be preferable to provide a relatively large coupling area between the part 41 and the reflector 50, between the part 41 and the parts 42 and 43, and between the part 41 and the backboard 10. Since each of the parts 41, 42 and 43 of the housing of the cavity phase shifter 40 is configured with an arm extending outward from the base, the extension length of the arm can be designed according to the needs of the coupling area, so as to provide a reliable grounding connection. In some embodiments, the overlapping areas of arms 412 (or arms 413) of part 41 and arms 422 of part 42 (or arms 432 of part 43) are greater than or equal to that of 50%, 60%, 70%, 80%, 90% or 100% of the area of arms 422 (or arms 432) to ensure the coupling area between the various parts of the housing. In some embodiments, the arms 412 (or arms 413) of the part 41 extend beyond the base 421 of the part 42 (or the base 431 of the part 43). This makes the coupling area between the part 41 and the part 42 (or part 43) equal to 100% of the area of the arms 422 (or arms 432), while increasing the coupling area between the part 41 and the reflector 50, and between the part 41 and the backboard 10.

The strip conductor 45 includes an input part 451 and an output part 452. The input part 451 extends rearwardly through the backboard 10 and the calibration plate 20 (FIG. 3A) so as to and may be welded or otherwise electrically connected to a trace 21 on the rear surface of the calibration plate 20. The trace 21 is electrically connected to an inner conductor of an RF cable that feeds the base station antenna via a first of the connectors 30, such that the strip conductor 45 is electrically connected to the inner conductor of the RF cable. In some embodiments, the input part 451 of the strip conductor 45 of the cavity phase shifter 40 may be directly welded to the trace 21 on the calibration plate 20, which avoids the use of additional transition pieces between the RF cable and the input of the cavity phase shifter 40, and also avoids the use of redundant solder joints, which helps to improve the PIM performance of the base station antenna.

Figure 3E:
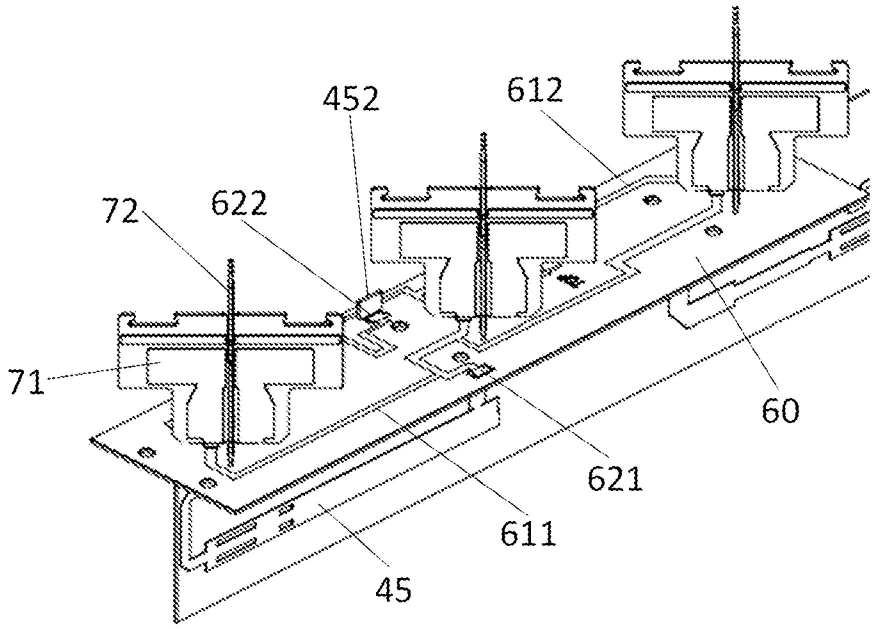
Figure 3F:
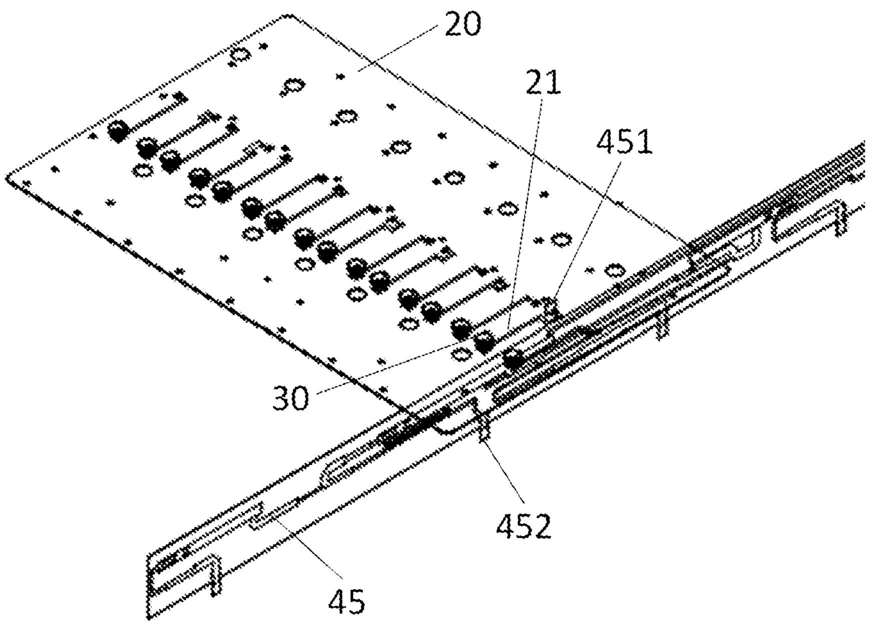

Referring to FIGS. 3D-3E, the output part 452 of the strip conductor 45 extends forwardly through the reflector 50 and one of the feed boards 60 in turn, and extends forwardly beyond the feed board 60, for example, through a hole 621 or 622 in the feed board 60, so as to be welded to the feed circuit 611 or 612 on the front surface of the feed board 60, such that the feed circuit 611 or 612 is electrically connected to the strip conductor 45. Multiple output parts 452 are provided so that the strip conductor may connect to each feed board 60 in one of the columns of radiating elements 70. The feed circuits 611 and 612 are respectively used to feed the radiators 71 operating in the first polarization direction (e.g. at an angle of +45° with respect to the longitudinal axis of the base station antenna) and the radiators 72 operating in the second polarization direction (e.g. at an angle of −45° with respect to the longitudinal axis of the base station antenna) of the dual-polarized radiating element 70. Each output part 452 of the strip conductor 45 may be directly welded to the feed circuit 611 or 612 on the feed board 60, which avoids the use of additional transition pieces between the output of the cavity phase shifter 40 and the feed board 60, and avoids the use of redundant welding points, which helps to improve the PIM performance of the base station antenna.

The strip conductor 45 includes an input part 451 and, as noted above, a plurality of output parts 452. The input part 451 is connected to the plurality of output parts 452 through a power distribution network. Each output part 452 is connected to a feed circuit on a feed board 60 to feed one of the radiators of each radiating element that is mounted on the feed board 60. For example, in the examples in FIG. 3B and FIG. 5A, each feed board 60 feeds to two or three radiating elements, and each output part 452 correspondingly feeds a first polarization radiator of two or three radiating elements. In the specific embodiment shown, the strip conductor 45 in one cavity of the cavity phase shifter 40 has five output parts 452, which respectively pass through five feed boards 60 to feed a total 12 radiating elements arranged in a column on the base station antenna.

The housing of each cavity phase shifter 40 forms two cavities 44-1 and 44-2, and each cavity 44-1 and 44-2 contains corresponding strip conductors 45-1 and 45-2. In the specific embodiment shown, the strip conductor 45-1 is coupled to the radiators 71 and 741 of the radiating elements 70 (e.g., the radiating elements 70-1) in a first column of the array (e.g., electrically connected to the feed circuit 611 on the feed boards 60 (e.g., the feed boards 60-1) of the first column) to feed the radiators operating in the first polarization direction of the dual-polarized radiating elements 70. The strip conductor 45-2 is coupled to the radiators 72 and 742 of the radiating elements 70 (e.g., the radiating elements 70-2) in the second column (e.g., electrically connected to the feed circuit 612 on the feed boards 60 (e.g., the feed boards 60-2) of the second column) to feed the radiators operating in the second polarization direction of the dual-polarized radiating elements 70 in the second column. It will be appreciated that in other embodiments, first and second strip conductors in a cavity phase shifter may be coupled to radiators of the radiating elements in a single column of the array. For example, the strip conductor 45-1 may be coupled to the radiators 71, 741 of the radiating elements 70 in a first column of the array, and the strip conductor 45-2 may be coupled to the radiators 72, 742 of the radiating elements 70 in the same first column of the array.

Although FIG. 3C and FIG. 3E only show the trace 21 on the calibration board 20, it should be understood that a directional coupler 22 and a power division network 23 (e.g., a cascade power divider) may also be provided on the calibration board 20. Each directional coupler 22 is a four-port device corresponding to a stripline conductor in a cavity of a cavity phase shifter 40. The directional coupler 22 outputs a small part of the power of the sub-component corresponding to the corresponding stripline conductor of the calibration test signal from its coupling port and transmits it to the power division network 23. The power division network 23 has a single calibration port 24. The signals output by each directional coupler 22 are combined by the power division network 23 to form a composite calibration signal, which is output from the calibration port 24, for example, to a calibration transceiver. The calibration transceiver can compare the composite calibration signal with a reference signal, and adjust the amplitude and/or phase of the signal components on each transmission channel based on the comparison, thereby normalizing the amplitude and phase of the sub-components of RF signals that are fed to each column of the array of radiating elements 70.

The cavity phase shifter 40 and its housing in the base station antenna according to the embodiment of the present disclosure are described above with reference to FIG. 3A to FIG. 3F, and FIG. 5A and FIG. 5B. In this specific embodiment, the housing of the cavity phase shifter 40 includes a part 41 having an "I"-shaped cross-section, and the parts 42 and 43 that each have a "U"-shaped cross-section. It should be understood that in other embodiments, the housing of the cavity phase shifter may have other configurations. FIG. 4A to FIG. 4K are schematic cross-sectional views of housings for a cavity phase shifter according to further embodiments of the present disclosure.

Figures 4A, 4B:
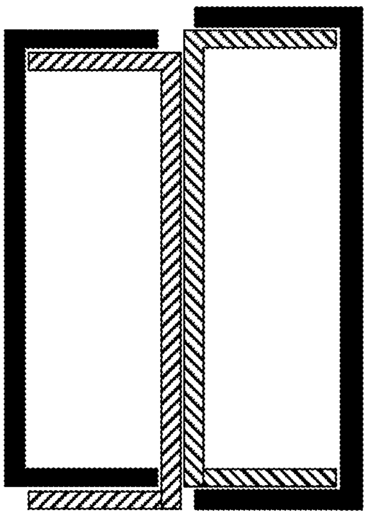
FIG. 4A to FIG. 4K are schematic cross-sectional views of a housing for a cavity phase shifter according to an embodiment of the present disclosure.

It should be understood that although the cavity phase shifter 40 has two cavities, the cavity phase shifter according to other embodiments may only have a single cavity. FIG. 4A and FIG. 4B are schematic cross-sectional views of a housing of a cavity phase shifter that has a single cavity. The housing comprises two parts that can be separated from each other (represented by black fill and hatching), and each part has a “U”-shaped cross-section. The two parts are assembled relative to each other to form the cavity. The two parts may be staggered up and down as shown in FIG. 4A to make the arms capacitively coupled, or one part may be embedded in the other part as shown in FIG. 4B to make the arms capacitively coupled.

Figure 4C:
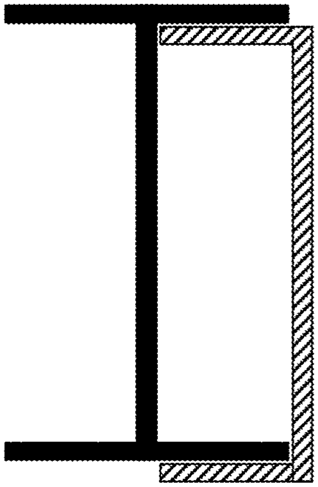
Figure 4D:
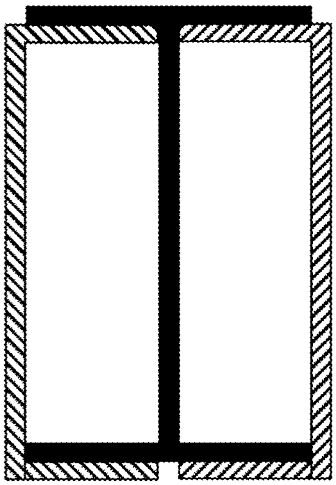
Figure 4E:
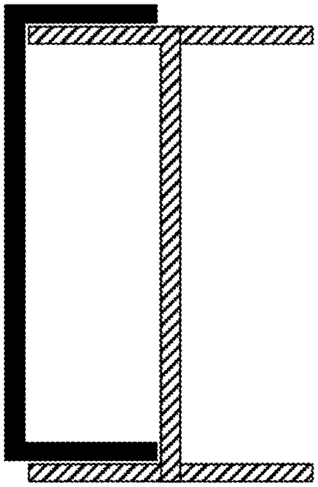
Figure 4F:
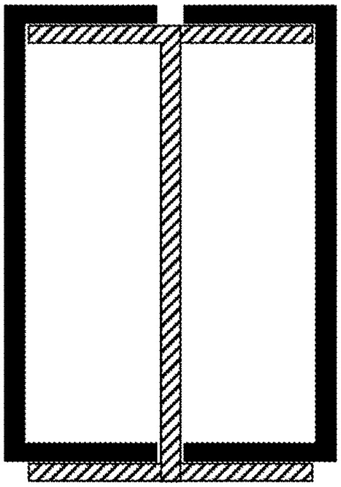
Figure 4G:
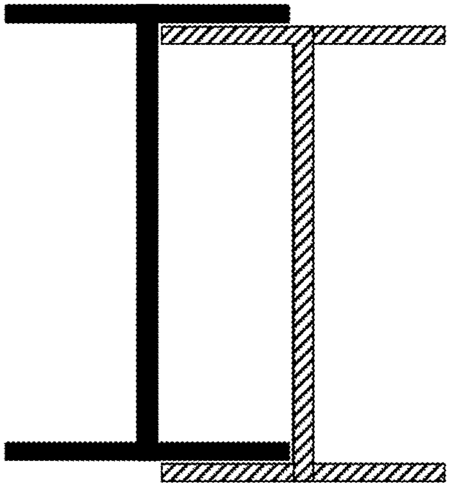
Figure 4H:
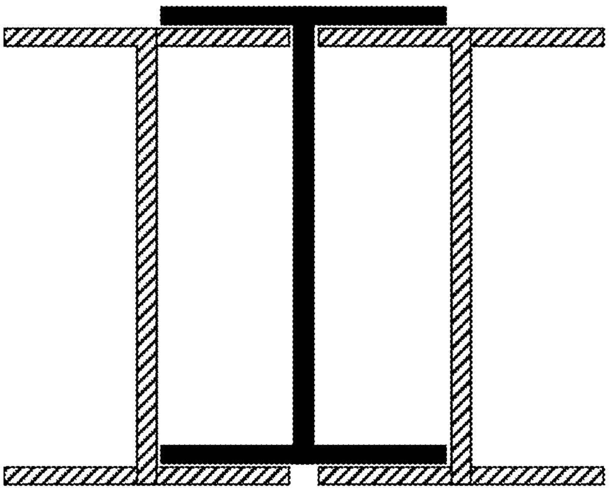
Figure 4I:
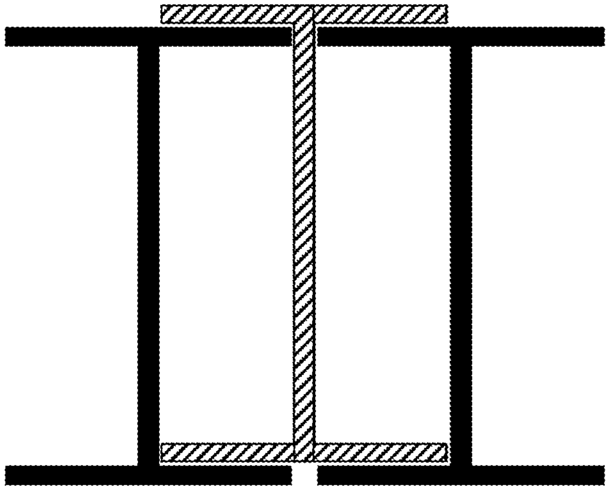
Figure 4J:
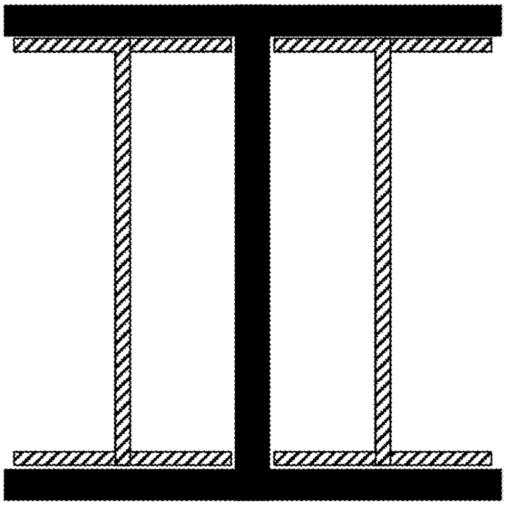
Figure 4K:
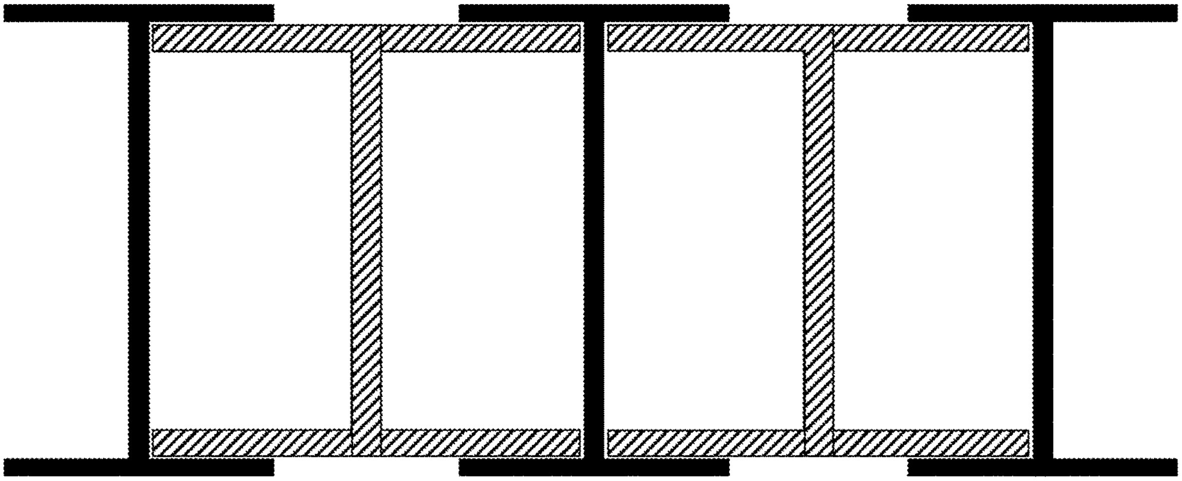

Either of the two parts constituting the housing may also have another arm extending opposite to the arms shown in FIGS. 4A and 4B to form an “I”-shaped cross-section, as shown in FIGS. 4C, 4E and 4G. The part with an “I”-shaped cross-section facilitates the formation of two adjacent cavities with other parts with an “I”-shaped cross-section or a “U”-shaped cross-section, wherein the “I”-shaped base in the middle serves as the common wall of the two adjacent cavities, as shown in FIGS. 4D, 4F, 4H, 4I and 4J. When the two parts forming a cavity have an “I”-shaped cross-section, each part can be used to form two adjacent cavities, that is, each part with an “I”-shaped cross-section can be used as a component for separating two adjacent cavities, as shown in FIG. 4K. In this way, more than two cavities can be provided. For example, in the example shown in FIG. 4K, the cavity phase shifter includes five parts to provide four cavities.

The possible configurations of the housing of the cavity phase shifter are described above with reference to FIGS. 4A to 4K. It should be understood that these are not exhaustive and restrictive. Any housing that can be separated from each other and assembled together to form a cavity for a cavity phase shifter that can achieve the purpose of the present disclosure belongs to the scope of the present disclosure.

Although some specific embodiments of the present disclosure have been described in detail by examples, those skilled in the art should understand that the above examples are only for illustration, not for limiting the scope of the present disclosure. The examples disclosed herein can be combined arbitrarily without departing from the spirit and scope of the present disclosure. Those skilled in the art should also understand that various modifications can be made to the examples without departing from the scope and spirit of the present disclosure. The scope of the present disclosure is defined by the attached claims.

That which is claimed is:

1. A housing for a cavity phase shifter, comprising:
a first part that extends along the longitudinal direction of the cavity phase shifter; and
a second part that is separate from the first part, and which extends along the length of the cavity phase shifter, wherein
the first part comprises a substantially flat first base and first arms that extend from the two widthwise edges of the first base toward the second part;
the second part comprises a substantially flat second base and second arms that extend from the two widthwise edges of the second base toward the first part; and
the first arms and the second arms at least partially overlap and are capacitively coupled to each other to form the first cavity of the cavity phase shifter.

2. The housing according to claim 1, wherein at least one of the first part and the second part is formed of sheet metal or metalized plastic.

3. The housing according to claim 1, further comprising:
a third part that is separate from both the first part and the second part, wherein the third part extends along the length of the cavity phase shifter and comprises a substantially flat third base and third arms that extend from the two widthwise edges of the third base toward the first part, wherein
the first part further comprises fourth arms that extend from the two widthwise edges of the first base away from the second part,
and the fourth arms and third arms at least partially overlap and are capacitively coupled to each other to form the second cavity of the cavity phase shifter.

4. The housing according to claim 1, wherein the overlapping areas of the first arms and the second arms are greater than or equal to 50%, 60%, 70%, 80%, 90% or 100% of the area of the second arms.

5. The housing according to claim 1, wherein the first arms extend beyond the second base.

6. The housing according to claim 1, wherein the second part further comprises fifth arms that extend from the two widthwise edges of the second base away from the first part.

7. A cavity phase shifter, comprising:
a grounded housing configured to form a first cavity extending along the length of the cavity phase shifter;
a strip conductor located in the first cavity and forming a stripline transmission line with the housing,
wherein the housing comprises:
a first part with a U-shaped cross-section; and
a second part with a U-shaped cross-section, wherein
the first part comprises a first base and first arms that extend from the two widthwise edges of the first base;
the second part comprises a second base and second arms that extend from the two widthwise edges of the second base; and
the second part is mounted to the first part in such a way that the first arms and the second arms at least partially overlap and are capacitively coupled to each other, so that a first cavity is formed between the first part and the second part.

8. The cavity phase shifter according to claim 7, wherein at least one of the first part and the second part is formed of sheet metal or metalized plastic.

9. The cavity phase shifter according to claim 7, wherein,
the housing further comprises a third part with a U-shaped cross-section, wherein the third part comprises a third base and third arms that extend from the two widthwise edges of the third base;
the first part further comprises fourth arms that extend from the two widthwise edges of the first base in a direction opposite to the direction in which the first arms extend;
and the third part is mounted to the first part in such a way that the fourth arms and the third arms at least partially overlap and are capacitively coupled to each other, so that a second cavity is formed between the first part and the third part.

10. The cavity phase shifter according to claim 7, wherein the first arms extend beyond the second base.

11. The cavity phase shifter according to claim 7, wherein the second part further comprises fifth arms that extend from the two widthwise edges of the second base in a direction opposite to the direction in which the second arms extend.

12. A base station antenna, comprising:
a backboard, which provides a ground plane;
a cavity phase shifter positioned at the front side of the backboard, wherein the cavity phase shifter comprises a first cavity, a housing forming the first cavity, and a first strip conductor located in the first cavity that forms a stripline transmission line with the housing;

a reflector positioned at the front side of the cavity phase shifter; and a first array of radiators positioned at the front side of the reflector, with the first strip conductor coupled to the first array, wherein the housing comprises a first part and a second part that can be separated from each other, of which, the first part comprises a substantially flat first base and first arms that extend from the two widthwise edges of the first base toward the second part;

the second part comprises a substantially flat second base and second arms that extend from the two widthwise edges of the second base toward the first part; and each of the first arms and the second arms at least partially overlap and are capacitively coupled to each other to form the first cavity, wherein the first of the first arms is capacitively coupled with the reflector and the second of the first arms is capacitively coupled with the backboard, such that the reflector, housing and backboard are commonly grounded.

13. The base station antenna according to claim 12, wherein the first strip conductor comprises a first input part and a first output part, the first input part passes through the backboard and protrudes backward to be coupled to a first radio frequency cable for feeding the base station antenna, and the first output part passes through the reflector and protrudes forward to be coupled to the first array.

14. The base station antenna according to claim 13, further comprising:

a feed board positioned between the reflector and at least one radiator in the first array, wherein the feed board comprises a feed circuit to feed at least one radiator, and wherein the first output part also passes through the feed board and protrudes forward to be welded and connected to the feed circuit, thereby being coupled to the first array.

15. The base station antenna according to claim 13, further comprising:

a calibration board positioned on the back side of the backboard, wherein the calibration board comprises a trace; and a connector configured to extend backward from the calibration board, wherein the trace is electrically connected to the first radio frequency cable via the connector, and the first input part also passes through the calibration board and protrudes backward to be welded to the trace, thereby being coupled to the first radio frequency cable.

16. The base station antenna according to claim 12, wherein the cavity phase shifter further comprises a second cavity formed by the housing and a second strip conductor located in the second cavity and forming a stripline transmission line with the housing;

the base station antenna further comprises a second array of radiators positioned on the front side of the reflector, with the second strip conductor coupled to the second array, wherein the housing further comprises a third part that is separable from the first part, of which, the third part comprises a substantially flat third base and two third arms that extend from the two widthwise edges of the third base toward the first part;

the first part further comprises two fourth arms that extend from the two widthwise edges of the first base away from the second part, and each of the fourth arms and corresponding third arms at least partially overlap and are capacitively coupled to each other to form the second cavity.

17. The base station antenna according to claim 16, wherein the first array is an array of radiators operating in the first polarization direction of a dual-polarized radiating element array, and the second array is an array of radiators operating in the second polarization direction of the dual-polarized radiating element array.

18. The base station antenna according to claim 16, wherein the first array is an array of radiators operating in one polarization direction of a first column of dual-polarized radiating elements, and the second array is an array of radiators operating in one polarization direction of a second column of dual-polarized radiating elements.

19. The base station antenna according to claim 12, wherein the first arms extend beyond the second base.

20. The base station antenna according to claim 12, wherein at least one of the first part and the second part is formed of sheet metal or metalized plastic.

* * * * *